US012726325B2

(12) United States Patent
Bolotin et al.

(10) Patent No.: US 12,726,325 B2
(45) Date of Patent: Sep. 1, 2026

(54) TRANSMISSION CONFIGURATION INDICATOR (TCI) CHAIN ENHANCEMENTS FOR NEW RADIO SYSTEMS

(71) Applicant: Intel Corporation, Santa Clara, CA (US)

(72) Inventors: Ilya Bolotin, Santa Clara, CA (US); Meng Zhang, Beijing (CN); Andrey Chervyakov, Maynooth (IE); Hua Li, Santa Clara, CA (US); Rui Huang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 18/559,018

(22) PCT Filed: Oct. 21, 2022

(86) PCT No.: PCT/US2022/047477
§ 371 (c)(1),
(2) Date: Nov. 3, 2023

(87) PCT Pub. No.: WO2023/069742
PCT Pub. Date: Apr. 27, 2023

(65) Prior Publication Data
US 2024/0235797 A1 Jul. 11, 2024

Related U.S. Application Data

(60) Provisional application No. 63/297,650, filed on Jan. 7, 2022, provisional application No. 63/270,872, filed on Oct. 22, 2021.

(51) Int. Cl.
*H04L 5/00* (2006.01)
*H04B 7/06* (2006.01)

(52) U.S. Cl.
CPC ......... *H04L 5/0094* (2013.01); *H04B 7/0626* (2013.01); *H04B 7/06964* (2023.05)

(58) Field of Classification Search
CPC . H04B 7/0626; H04B 7/06964; H04L 5/0094; H04L 5/0048
See application file for complete search history.

(56) References Cited

U.S. PATENT DOCUMENTS

2021/0144569 A1* 5/2021 Zhou .................... H04W 24/08
2021/0391899 A1* 12/2021 Cao ...................... H04B 17/373
(Continued)

FOREIGN PATENT DOCUMENTS

WO 2021/172942 A1 9/2021

OTHER PUBLICATIONS

International Patent Office—International Search Report and Written Opinion mailed Feb. 23, 2023, from International Patent Application No. PCT/US2022/047477, 10 pages.
(Continued)

*Primary Examiner* — Brian D Nguyen
(74) *Attorney, Agent, or Firm* — Alliance IP, LLC

(57) ABSTRACT

This disclosure describes an apparatus comprising a memory to store downlink (DL) transmission configuration indicator (TCI) state chain information, and a processing circuitry, coupled with the memory, to retrieve the DL TCI state chain information from the memory, wherein the DL TCI state information includes an indication of a source reference signal (RS) for a synchronization signal block (SSB) associated with a physical cell identifier that is different from an identifier of a serving cell, and monitor an SSB based on the DL TCI state chain information.

17 Claims, 7 Drawing Sheets

(56) References Cited

U.S. PATENT DOCUMENTS

2023/0144547 A1* 5/2023 Bhamri .............. H04B 7/06952 370/330
2023/0319591 A1* 10/2023 Zhou ..................... H04L 5/0023 370/329
2023/0337208 A1* 10/2023 Zhou ...................... H04B 7/022
2024/0056150 A1* 2/2024 Yuan ..................... H04W 76/20
2024/0097850 A1* 3/2024 Zhou .................. H04B 7/06968
2024/0171253 A1* 5/2024 Bai ...................... H04B 7/0695
2024/0267978 A1* 8/2024 Caporal Del Barrio ..................... H04B 7/0695

OTHER PUBLICATIONS

Apple Inc., "Discussion on RRM requirements for L1/L2 Centric Mobility and Unified TCI," 3GPP TSG-RAN WG4 Meeting # 100-e, R4-2112109, Agenda item: 9.19.3.2, Aug. 16-27, 2021, Electronic Meeting, 9 pages.
CATT, "Further discussion on Rel-17 multi-beam operation," 3GPP TSG RAN WG1 #106bis-e, R1-2109184, Agenda Item: 8.1.1, Oct. 11-19, 2021, e-Meeting, 12 pages.
Intel Corporation, "Enhancements to Multi-Beam Operation," 3GPP TSG RAN WG1 #106bis-e, R1-2109591, Agenda item: 8.1.1, Oct. 11-19, 2021, e-Meeting, 10 pages.
Lenovo, et al., "Enhancements on Multi-beam Operation," 3GPP TSG RAN WG1 #106bis-e, R1-2109103, Agenda Item: 8.1.1, Oct. 11-19, 2021, e-Meeting, 14 pages.
3GPP, "Technical Specification Group Radio Access Network; NR; Requirements for support of radio resource management (Release 17)," 3GPP TS 38.133 V17.3.0 (Sep. 2021), 5G, 3,209 pages.

* cited by examiner

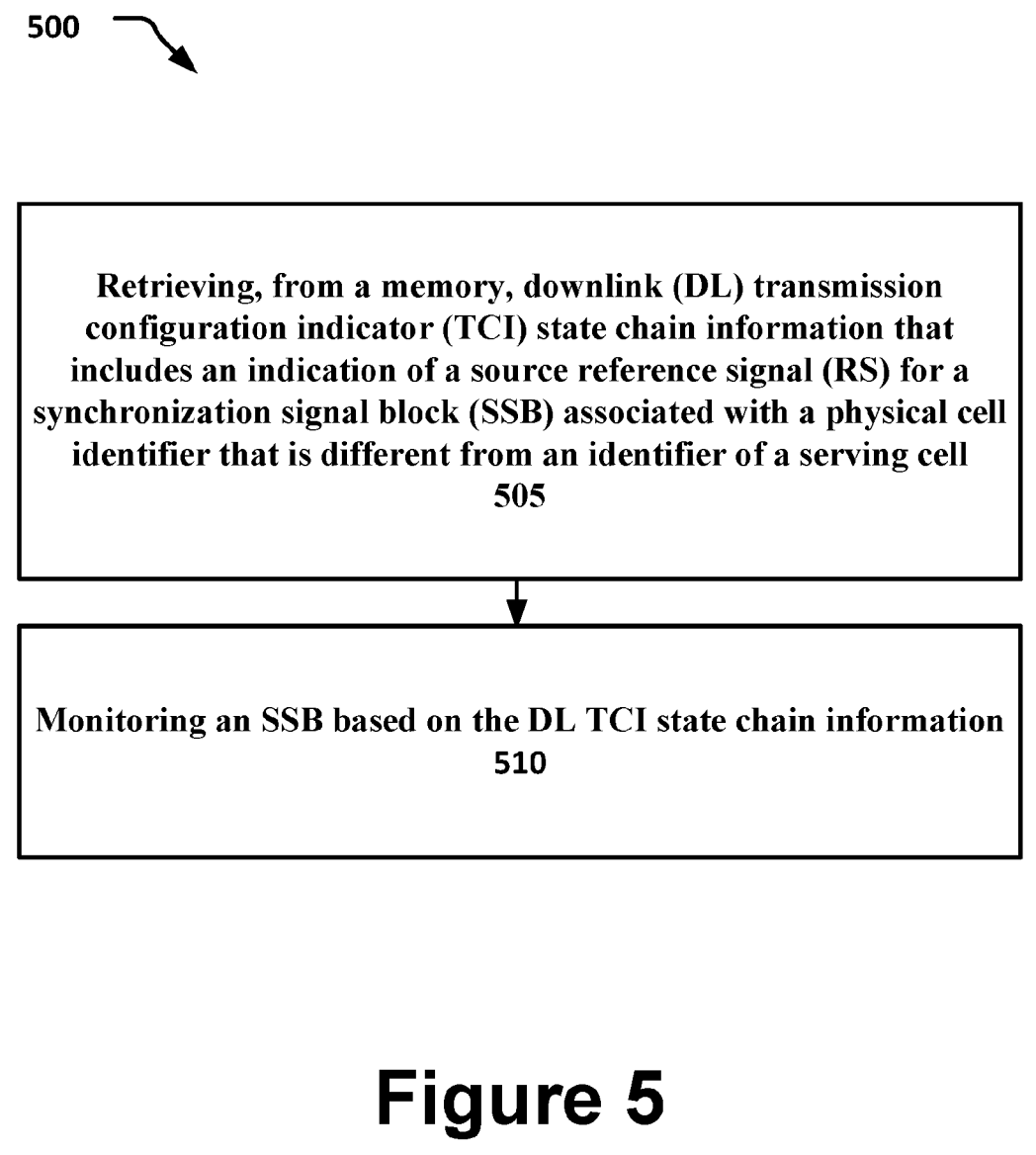

500

Retrieving, from a memory, downlink (DL) transmission configuration indicator (TCI) state chain information that includes an indication of a source reference signal (RS) for a synchronization signal block (SSB) associated with a physical cell identifier that is different from an identifier of a serving cell
505

Monitoring an SSB based on the DL TCI state chain information
510

Figure 5

Determining downlink (DL) transmission configuration indicator (TCI) state chain information that includes an indication of a source reference signal (RS) for a synchronization signal block (SSB) associated with a physical cell identifier that is different from an identifier of a serving cell
605

Monitoring an SSB based on the DL TCI state chain information
610

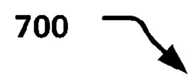

Determining joint uplink (UL) and downlink (DL) transmission configuration indicator (TCI) state chain information that includes an indication of a synchronization signal block (SSB) and one or more channel state information-reference signal (CSI-RS) resources, wherein a TCI state of a first reference signal includes a second reference signal in a common TCI chain
705

Monitoring an SSB based on the joint UL and DL TCI state chain information
710

Figure 7

TRANSMISSION CONFIGURATION INDICATOR (TCI) CHAIN ENHANCEMENTS FOR NEW RADIO SYSTEMS

CROSS REFERENCE TO RELATED APPLICATION

The present application is a national phase entry under 35 U.S.C. § 371 of International Application No. PCT/US2022/047477, filed Oct. 21, 2022, entitled "TRANSMISSION CONFIGURATION INDICATOR (TCI) CHAIN ENHANCEMENTS FOR NEW RADIO SYSTEMS," which claims priority to U.S. Provisional Patent Application No. 63/270,872, which was filed Oct. 22, 2021; and to U.S. Provisional Patent Application No. 63/297,650, which was filed Jan. 7, 2022, the entire disclosures of which are hereby incorporated by reference.

FIELD

Various embodiments generally may relate to the field of wireless communications. For example, some embodiments may relate to enhancements to transmission configuration indicator (TCI) chains for new radio (NR) systems.

BACKGROUND

The legacy transmission configuration indicator (TCI) chain may only work for quasi co-location (QCL) information in Release-15 and/or Release-16 (Rel-15/Rel-16) networks. In Rel-17, both uplink (UL) and downlink (DL) TCI are designed in a unified TCI framework. Therefore, it may be desirable to update the TCI chain definition in the specification. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 5, 6, and 7 illustrate examples of procedures for practicing the various embodiments discussed herein.

DETAILED DESCRIPTION

Figure 1:
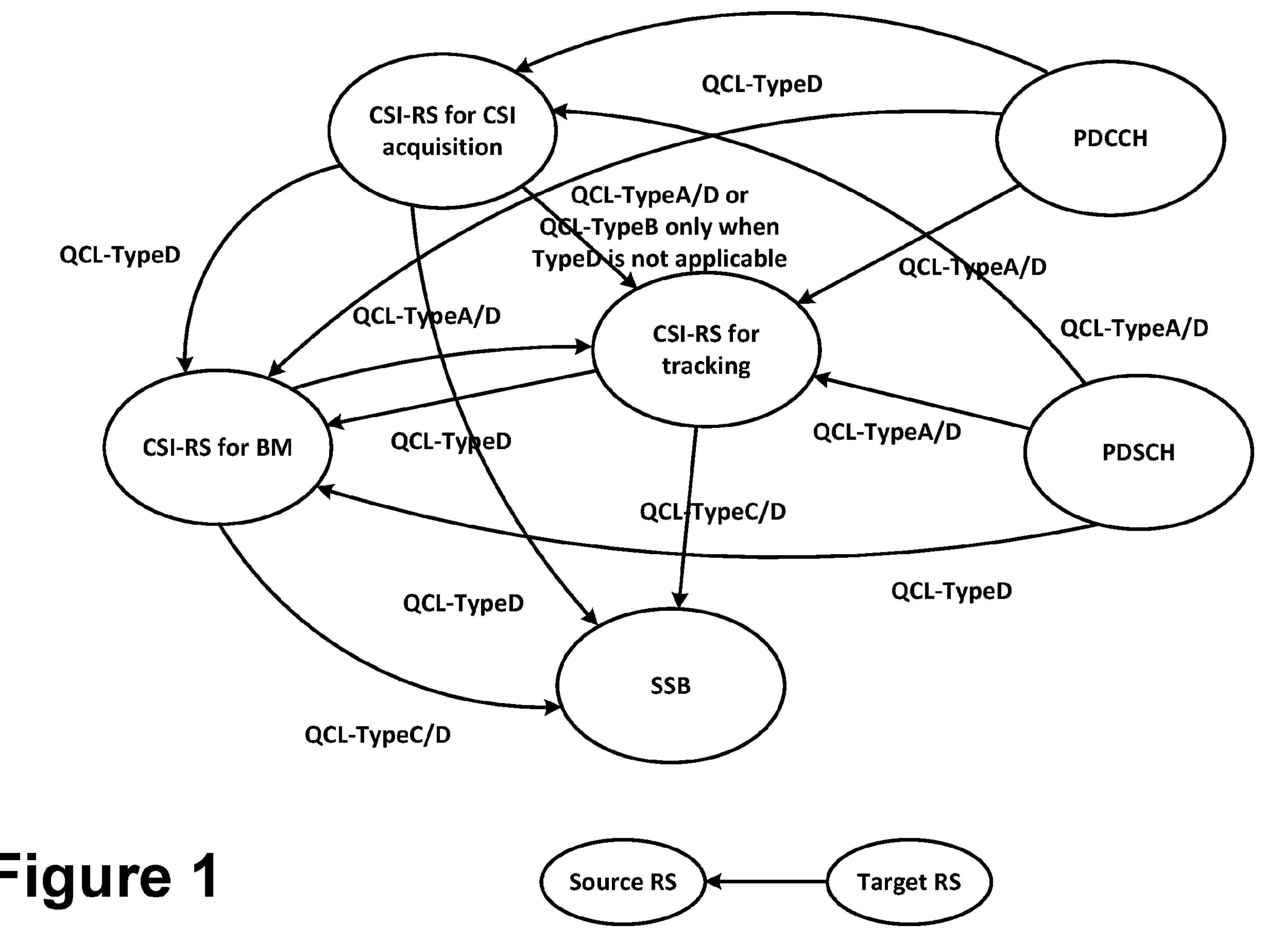
FIG. 1 illustrates an example of a TCI chain for a QCL rule in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc, in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

TCI Chain

As introduced above, in legacy Rel-15/16, only DL TCI state switching is applied, therefore, it may be possible to have the definition of TCI chain. However, In Rel-17, the unified TCI framework is introduced, and there may be TCI state chain for both DL and UL. Therefore, it may be desirable to update the TCI chain concept for Rel-17. It's not kind of update of QCL definition, while it's update for TCI chain.

In some embodiments disclosed herein, the DL TCI chain and UL TCI chain are newly defined for the Rel-17 unified TCI state. For DL TCI chain, SSB associated with a different PCID is added as a source RS. For UL TCI state chain, SSB, SRS or CSI-RS will be considered as source RS.

For DL, In Rel-17, inter-cell beam management (BM) may also discussed as follows:

Agreement

On Rel. 17 beam indication enhancements for inter-cell beam management, the supported Rel-17 MAC-CE-based and/or DCI-based beam indication (at least using DCI formats 1_1/1_2 with and without DL assignment including the associated MAC-CE-based TCI state activation) applies to:

- The channels and signals as for intra-cell beam management except for non-UE dedicated channels/signals
- For the aforementioned applicable channels and signals, SSB associated with a physical cell ID different from that of the serving cell is used as an indirect QCL reference for DL TCI (in case of separate DL/UL TCI) or joint TCI, or an indirect/direct QCL reference for UL TCI (in case of separate DL/UL TCI)

Note: When RS X is an indirect QCL reference of a target channel, there exists at least one other source signal on the QCL chain between RS X and the target channel. Here, Rel-15/16 QCL rule is reused by replacing SSB with SSB associated with a physical cell ID different from that of the serving cell.

In some embodiments, for inter-cell BM, SSB associated with a different PCID can be used as the source RS in the TCI chain for inter-cell BM, which is different from the serving cell TCI chain. Therefore, it may be desirable to add SSB associated with a different PCID in the DL TCI chain as well. DL TCI chain can apply for separate DL TCI state or joint TCI state switching. A new DCI TCI chain is added for Rel-17 unified TCI state framework as described below.

Applicability of QCL

For the requirements specified in this version of the specification for TCI state switching, a reference signal is considered to be QCLed to another reference signal if it is in the same TCI chain as the other reference signal, provided that the number of Reference Signals in the chain is no more than 4. It is assumed there is single QCL type per TCI chain.

A TCI chain consists of an SSB, and one or more CSI-RS resources, and the TCI state of each Reference Signal includes another Reference Signal in the same TCI chain.

DMRS of PDCCH or PDSCH is QCLed with the reference signal in its active TCI state and any other reference signal that is QCLed, based on above criteria, with the reference signal in the active TCI state.

For the requirements specified in this version of the specification for separate DL TCI state or joint TCI state switching, a reference signal is considered to be QCLed to another reference signal if it is in the same DL TCI chain as the other reference signal, provided that the number of Reference Signals in the chain is no more than 4. It is assumed there is single QCL type per TCI chain.

A DL TCI chain consists of an SSB, and one or more CSI-RS resources, or SSB associated with a different PCID, and the TCI state of each Reference Signal includes another Reference Signal in the same TCI chain.

DMRS of PDCCH or PDSCH is QCLed with the reference signal in its active TCI state and any other reference signal that is QCLed, based on above criteria, with the reference signal in the active TCI state.

For UL TCI state switching, SSB, SRS or CSI-RS may be considered the source RS in the UL TCI chain. UL TCI chain will be used for UL spatial relation switching. A similar way can be defined, a new UL TCI chain definition for UL spatial relation is as follows:

Applicability of UL Spatial Relation

For the requirements specified in this version of the specification for separate UL TCI state switching, a reference signal is considered to provide reference for determining UL spatial relation for another reference signal if it is in the same UL TCI chain as the other reference signal, provided that the number of Reference Signals in the chain is no more than 4.

A UL TCI chain consists of an SSB, and one or more CSI-RS resources, or SRS, and the TCI state of each Reference Signal includes another Reference Signal in the same TCI chain.

TRP-Specific BFR

It has been agreed that TRP specific BFR requirement may be studied as follows:

RAN4 will specify the TRP specific BFR including requirements for beam failure detection (BFD), candidate beam identification (CBD) and beam failure recovery request (BFRQ) assuming 2 BFD-RS sets in mTRP operations For TRP-specific BFR, it has been agreed that the UE PHY layer reports to the MAC layer that beam failure happens for a given TRP when estimated hypothetic BLER, Qout, LR, is above a threshold for all measured BFD RS(s) in the BFD RS set corresponding to that TRP. Some RAN1 agreements are as follow:

Ran1 Agreements:

Agreement

The maximum number of BFD-RS resources per set is a UE capability, including a possible candidate value of 1 in Rel. 17.

Agreement

Support the following BFD-RS configurations in Rel. 17 for UEs with one activated TCI state per CORESET:

Explicit configuration of BFD-RS resources in BFD-RS set k, k=0, 1

FFS: CORESETs with more than 1 activated TCI state.

Agreement

To associate BFD-RS set k and NBI-RS set j

Alt-1: 1-to-1, fixed in spec

Whether NBI-RS configuration is mandatory is separate discussion

As illustrated above, TRP-specific BFR for the case of CORESET with 2 TCI states is not supported in Rel-17. Embodiments of the present disclosure may be used to address these and other issues.

As opposed to cell-specific BFD, there are several BFD-RS sets and one BFD-RS set will be configured for one TRP. Since it's still under discussion that whether UE can support simultaneous reception from two TRP, some embodiments can define a delay requirement for BFD assuming that the UE will perform BFD in TDM manner.

Therefore, the measurement delay will be scaled by the number of BFD-RS sets. Currently, there are at most two BFD-RS sets defined in RAN1. For CBD, since BFD-RS and NBI-RS are one to one mapping, the same assumption and requirement can be assumed.

QCL Chain for Rel-17 FeMIMO

In legacy 38.133, TCI state only refers to DL TCI state, and all the source RS are the RS from serving cell, e.g. both serving cell SSB and some CSI-RSs can be the source RS in the DL TCI chain.

In Rel-17, unified TCI framework is introduced, which will be used for serving cell and inter-cell BM. Embodiments herein provide techniques for the QCL chain used in further enhanced multiple input multiple output (FeMIMO) in RAN4.

TCI Framework

In legacy 38.133, TCI state only refers to a DL TCI state, and all the source RSs are the RSs from a serving cell, e.g. both serving cell SSB and some CSI-RSs can be the source RS in the DL TCI chain.

Rel-17 Unified TCI framework will be used for Rel-17 serving cell and inter-cell beam management. Therefore, some embodiments may address the QCL and TCI chain for Rel-17 serving cell and inter-cell BM where unified TCI framework is used.

QCL and TCI Chain for Rel-17 Serving Cell and Inter-Cell BM.

This disclosure proceeds by addressing the issue for serving cell TCI chain and inter-cell TCI chain respectively.

QCL Chain for Serving Cell

For legacy Rel-15 TCI, an example of the TCI chain is shown in FIG. 1. In some embodiments, SSB will be base source RS in the TCI chain, and CSI-RRS for BM/tracking/CSI acquisition can be used as the source RS in the TCI chain as well.

Some embodiments may utilize the following definition of QCL chain in Rel-15 RAN4, which is defined as follows:

Applicability of QCL

For the requirements specified in this version of the specification, a reference signal is considered to be QCLed to another reference signal if it is in the same TCI chain as the other reference signal, provided that the number of Reference Signals in the chain is no more than 4. It is assumed there is single QCL type per TCI chain.

A TCI chain includes an SSB, and one or more CSI-RS resources, and the TCI state of each Reference Signal includes another Reference Signal in the same TCI chain.

DMRS of PDCCH or PDSCH is QCLed with the reference signal in its active TCI state and any other reference signal that is QCLed, based on above criteria, with the reference signal in the active TCI state.

In Rel-17, Unified TCI framework is introduced, and there are Joint TCI and separate TCI mode. For separate TCI for DL/UL, some embodiments may define UL and DL TCI chain for them separately. For joint TCI, since common source RS will be used for DL TCI and UL TCI, if the source RS can't be used for DL TCI and UL TCI simultaneously, it can't be used as the source RS in the join TCI chain.

Some embodiments may be directed to defining the TCI chain, whether it's a joint TCI chain or define separate TCI chain for DL/UL separately.

In RAN1 #104-e it was agreed that legacy source/target QCL relations are also valid for the Rel-17 unified TCI framework. There was additional discussion whether SRS for beam management should be supported as additional source RS for DL QCL Type D. There are many discussions in RAN1 in following meetings and there is no consensus till RAN1 #106bis meeting.

In some embodiments the TCI chain may be defined for UL TCI and DL TCI separately, the only difference for joint TCI and separate TCI is that whether a common RS can be used as the source RS for both DL and UL.

If separate DL/UL TCI chain is defined, it will also apply for joint TCI. Therefore, for UL TCI chain, SRS can be added in the UL TCI chain. For serving cell, if a separate TCI chain is designed, the TCI chain is defined as follows:

A DL TCI chain for serving cell includes an SSB, and one or more CSI-RS resources, and the TCI state of each Reference Signal includes another Reference Signal in the same TCI chain.

A UL TCI chain for serving cell includes an SSB, and one or more CSI-RS resources, SRS and the TCI state of each Reference Signal includes another Reference Signal in the same TCI chain.

If a joint TCI chain can also be designed, a TCI chain for serving cell includes an SSB, and one or more CSI-RS resources, or SRS for UL, and the TCI state of each Reference Signal includes another Reference Signal in the same TCI chain.

QCL Chain for Inter-Cell BM

In Rel-17, inter-cell beam management (BM) are also discussed in RAN1:

Agreement

On Rel. 17 beam indication enhancements for inter-cell beam management, the supported Rel-17 MAC-CE-based and/or DCI-based beam indication (at least using DCI formats 1_1/1_2 with and without DL assignment including the associated MAC-CE-based TCI state activation) applies to:

- The channels and signals as for intra-cell beam management except for non-UE dedicated channels/signals
- For the aforementioned applicable channels and signals, SSB associated with a physical cell ID different from that of the serving cell is used as an indirect QCL reference for DL TCI (in case of separate DL/UL TCI) or joint TCI, or an indirect/direct QCL reference for UL TCI (in case of separate DL/UL TCI)

Note: When RS X is an indirect QCL reference of a target channel, there exists at least one other source signal on the QCL chain between RS X and the target channel. Here, Rel-15/16 QCL rule is reused by replacing SSB with SSB associated with a physical cell ID different from that of the serving cell.

In some embodiments, the SSB associated with a physical cell ID different from that of the serving cell is used as an indirect QCL reference for DL TCI (in case of separate DL/UL TCI) or joint TCI, or an indirect/direct QCL reference for UL TCI (in case of separate DL/UL TCI).

Therefore, for inter-cell BM, SSB associated with a different PCID can be used as the source RS in the TCI chain for inter-cell BM, which is different from the serving cell TCI chain. Some embodiments may define separate TCI chains for serving cell and inter-cell.

For inter-cell BM TCI chain, SSB associated with a different physical cell ID will be included in the TCI chain, one example is as follows:

If Separate TCI Chains are Used:

A DL TCI chain for inter-cell BM includes an SSB, and one or more CSI-RS resources, SSB associated with different PCI, and the TCI state of each Reference Signal includes another Reference Signal in the same TCI chain.

A UL TCI chain for inter-cell BM includes an SSB, and one or more CSI-RS resources, SRS and SSB associated with different PCI, the TCI state of each Reference Signal includes another Reference Signal in the same TCI chain.

If a Joint TCI Chain can Also be Designed:

A TCI chain for inter-cell BM includes an SSB, and one or more CSI-RS resources, and SRS for UL TCI, and SSB associated with different PCI, and the TCI state of each Reference Signal includes another Reference Signal in the same TCI chain.

Systems and Implementations

Figure 2:
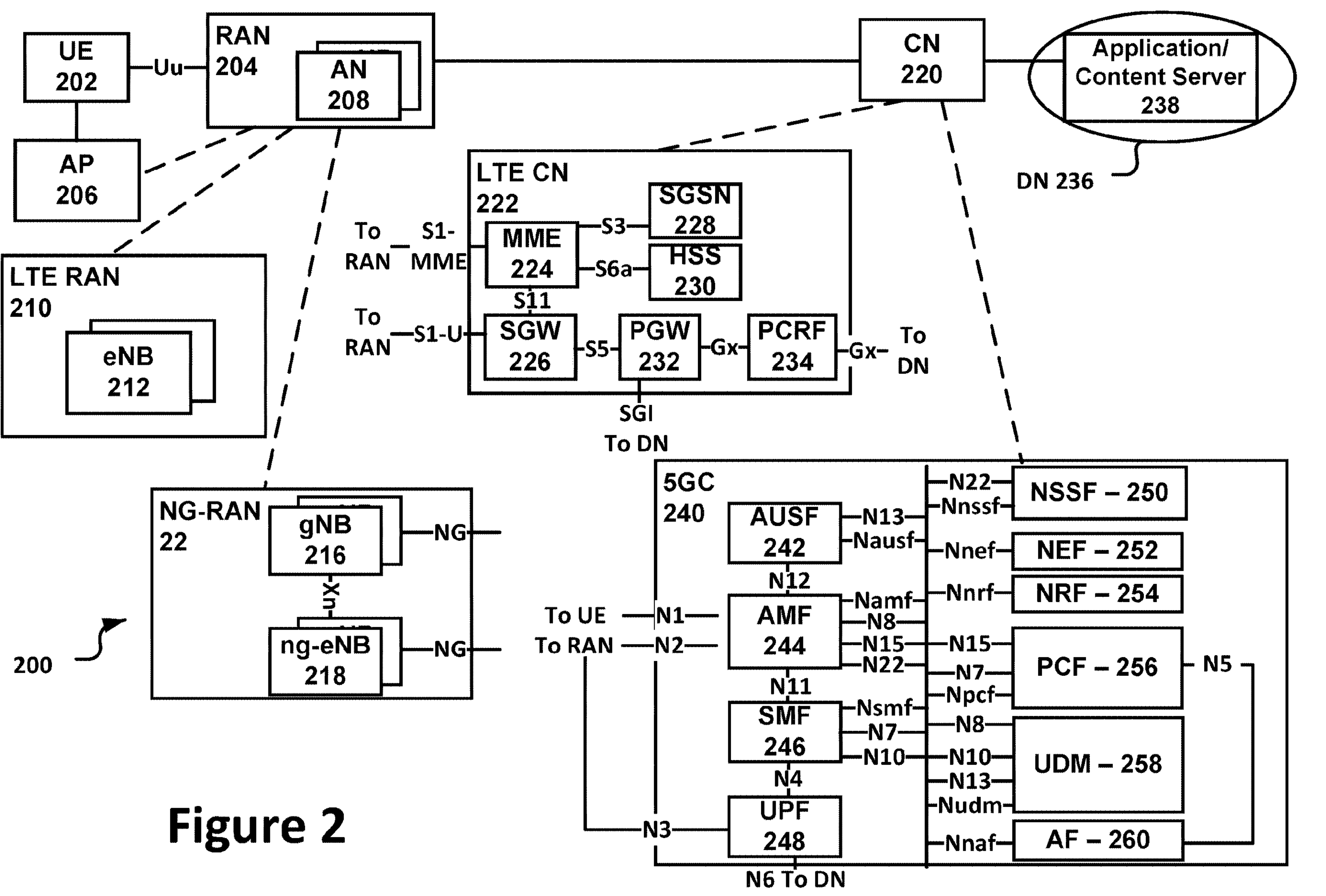
FIG. 2 schematically illustrates a wireless network in accordance with various embodiments.
Figure 3:
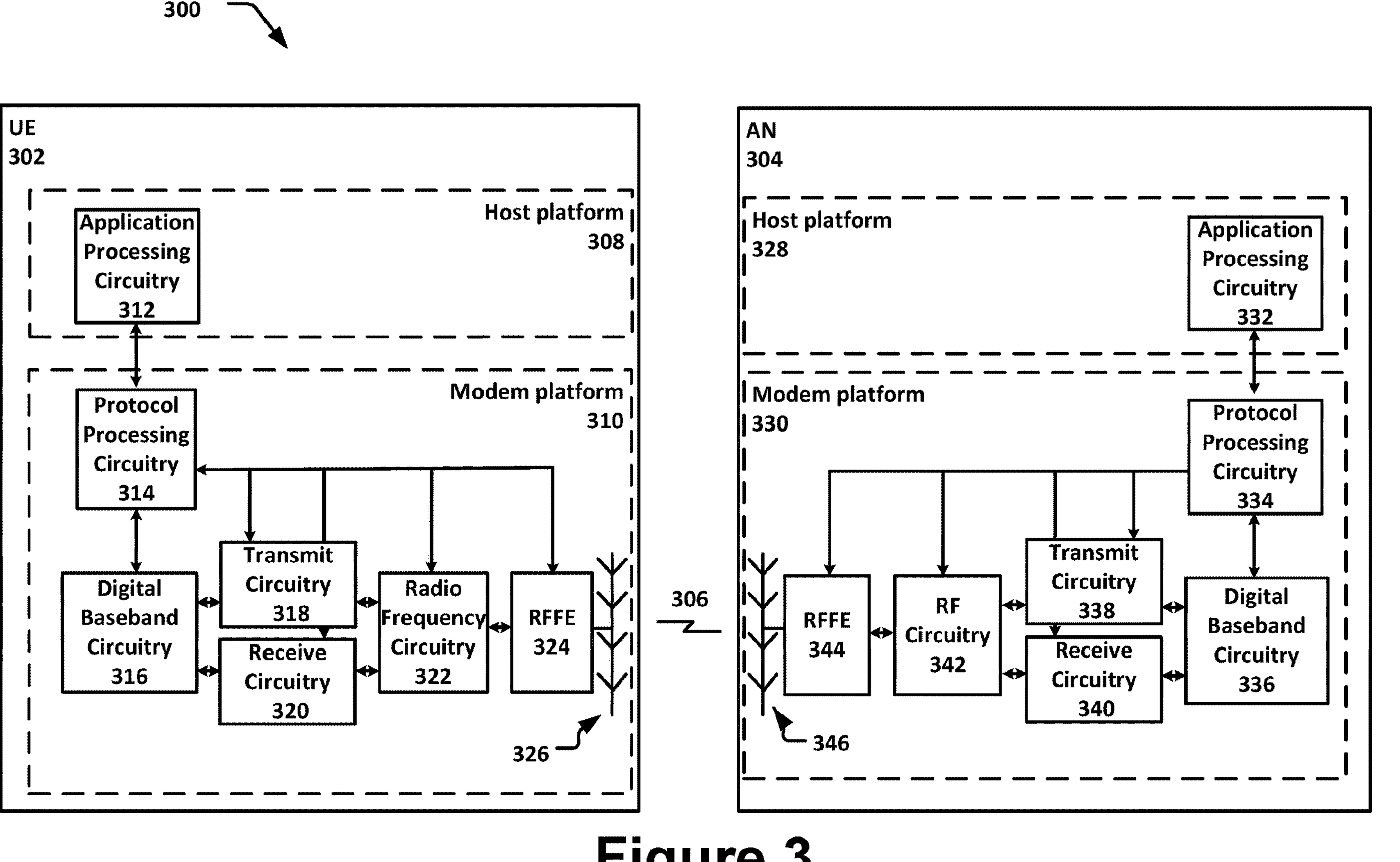
FIG. 3 schematically illustrates components of a wireless network in accordance with various embodiments.
Figure 4:
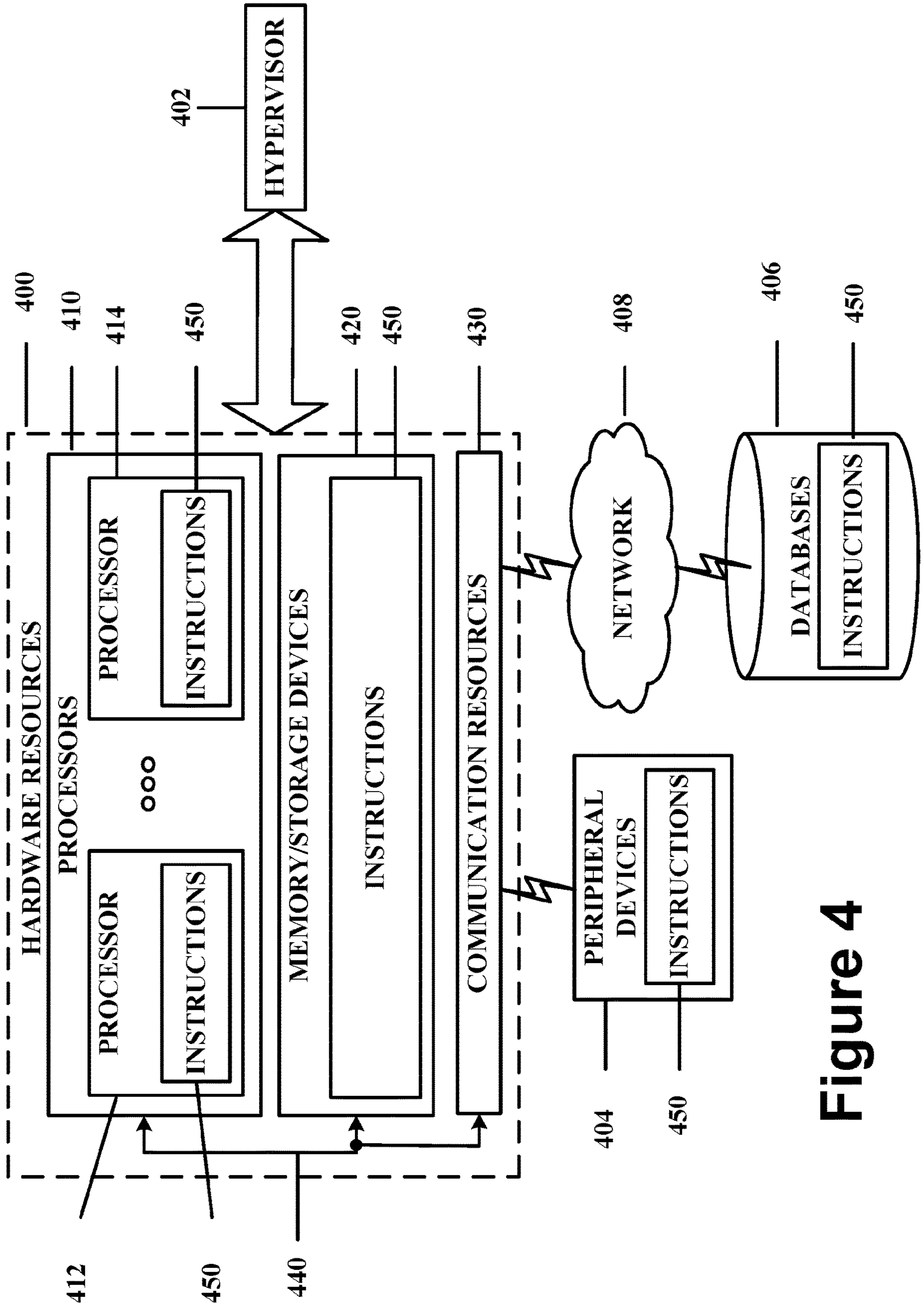
FIG. 4 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 2-4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be communicatively coupled with the RAN 204 by a Uu interface. The UE 202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, AN 208. AN 208 may terminate air-interface protocols for the UE 202 by providing access stratum protocols including RRC. PDCP, RLC, MAC, and L1 protocols. In this manner, the AN 208 may enable data/voice connectivity between CN 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low power base station for providing femtocells, picocells or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc, to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second 20) AN may be secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 202 or AN 208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU": an eNB may be referred to as an "eNB-type RSU": a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: SCS of 15 kHz: CP-OFDM waveform for DL and SC-FDMA waveform for UL; turbo codes for data and TBCC for control; etc. The LTE air interface may rely on CSI-RS for CSI acquisition and beam management: PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHZ bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface, but may connect with a UE via an LTE air interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS: CP-OFDM for DL. CP-OFDM and DFT-s-OFDM for UL: polar, repetition, simplex, and Reed-Muller codes for control and LDPC for data. The 5G-NR air interface may rely on CSI-RS. PDSCH/PDCCH DMRS similar to the LTE air interface. The 5G-NR air interface may not use a CRS, but may use PBCH DMRS for PBCH demodulation: PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (for example, PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220) onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be an LTE CN 222, which may also be referred to as an EPC. The LTE CN 222 may include MME 224, SGW 226, SGSN 228, HSS 230, PGW 232, and PCRF 234 coupled with one another over interfaces (or "reference points") as shown. Functions of the elements of the LTE CN 222 may be briefly introduced as follows.

The MME 224 may implement mobility management functions to track a current location of the UE 202 to facilitate paging, bearer activation/deactivation, handovers, gateway selection, authentication, etc.

The SGW 226 may terminate an S1 interface toward the RAN and route data packets between the RAN and the LTE CN 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track a location of the UE 202 and perform security functions and access control. In addition, the SGSN 228 may perform inter-EPC node signaling for mobility between different RAT networks: PDN and S-GW selection as specified by MME 224: MME selection for handovers: etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable transfer of subscription and authentication data for authenticating/authorizing user access to the LTE CN 220).

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 2 36 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate Qos and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit an Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore. AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208): UE IP address allocation and management (including optional authorization): selection and control of UP function: configuring traffic steering at UPF 248 to route traffic to proper destination: termination of interfaces toward policy control functions: controlling part of policy enforcement, charging, and QoS: lawful intercept (for SM events and interface to L1 system); termination of SM parts of NAS messages: downlink data notification: initiating AN specific SM information, sent via AMF 244 over N2 to AN 208; and determining SSC mode of a session. SM may refer to management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnect to data network 236, and a branching point to support multi-homed PDU session. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating. UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs, if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for third party, internal exposure/re-exposure. AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on exposed capabilities of other NFs. This information may be stored at the NEF 252 as structured data, or at a data storage NF using standardized interfaces. The stored information can then be re-exposed by the NEF 252 to other NFs and AFs, or used for other purposes such as analytics. Additionally, the NEF 252 may exhibit an Nnef service-based interface.

The NRF 254 may support service discovery functions, receive NF discovery requests from NF instances, and provide the information of the discovered NF instances to the NF instances. NRF 254 also maintains information of available NF instances and their supported services. As used herein, the terms “instantiate.” “instantiation.” and the like may refer to the creation of an instance, and an “instance” may refer to a concrete occurrence of an object, which may occur, for example, during execution of program code. Additionally, the NRF 254 may exhibit the Nnrf service-based interface.

The PCF 256 may provide policy rules to control plane functions to enforce them, and may also support unified policy framework to govern network behavior. The PCF 256 may also implement a front end to access subscription information relevant for policy decisions in a UDR of the UDM 258. In addition to communicating with functions over reference points as shown, the PCF 256 exhibit an Npcf service-based interface.

The UDM 258 may handle subscription-related information to support the network entities' handling of communication sessions, and may store subscription data of UE 202. For example, subscription data may be communicated via an N8 reference point between the UDM 258 and the AMF 244. The UDM 258 may include two parts, an application front end and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258. PCF 256, and NEF 252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240) may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit an Naf service-based interface.

The data network 236 may represent various network operator services, Internet access, or third party services that may be provided by one or more servers including, for example, application/content server 238.

FIG. 3 schematically illustrates a wireless network 300 in accordance with various embodiments. The wireless network 300 may include a UE 302 in wireless communication with an AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling, and can be consistent with cellular communications protocols such as an LTE protocol or a 5G NR protocol operating at mmWave or sub-6 GHZ frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more of layer operations to facilitate transmission or reception of data over the connection 306. The layer operations implemented by the protocol processing circuitry 314 may include, for example, MAC, RLC, PDCP. RRC and NAS operations.

The modem platform 310 may further include digital baseband circuitry 316 that may implement one or more layer operations that are “below” layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include main memory, disk storage, or any suitable combination thereof. The memory/storage devices 420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

Example Procedures

In some embodiments, the electronic device(s), network(s), system(s), chip(s) or component(s), or portions or implementations thereof, of FIGS. 2-4, or some other figure herein, may be configured to perform one or more processes, techniques, or methods as described herein, or portions thereof. One such process is depicted in FIG. 5, which may be performed by a user equipment (UE) or portion thereof in some embodiments. In this example, process 500 includes, at 505, retrieving, from a memory, downlink (DL) transmission configuration indicator (TCI) state chain information that includes an indication of a source reference signal (RS) for a synchronization signal block (SSB) associated with a physical cell identifier that is different from an identifier of a serving cell. The process further includes, at 510, monitoring an SSB based on the DL TCI state chain information.

Figure 6:
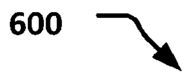

Another such process is depicted in FIG. 6. In this example, process 600 includes, at 605, determining downlink (DL) transmission configuration indicator (TCI) state chain information that includes an indication of a source reference signal (RS) for a synchronization signal block (SSB) associated with a physical cell identifier that is different from an identifier of a serving cell. The process further includes, at 610, monitoring an SSB based on the DL TCI state chain information.

Another such process is depicted in FIG. 7. In this example, process 700 includes, at 705, determining joint uplink (UL) and downlink (DL) transmission configuration indicator (TCI) state chain information that includes an indication of a synchronization signal block (SSB) and one or more channel state information-reference signal (CSI-RS) resources, wherein a TCI state of a first reference signal includes a second reference signal in a common TCI chain. The process further includes, at 710, monitoring an SSB based on the joint UL and DL TCI state chain information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc, as described above in connection with one or more of the preceding figures may be configured to operate in accordance with one or more of the examples set forth below in the example section.

EXAMPLES

Example 1 may include for Rel-17, DL/UL TCI chain are newly defined for unified TCI framework.

Example 2 may include for DL TCI chain, SSB associated with a different PCID is added as a source RS.

Example 3 may include DL TCI chain can apply for separate DL TCI state or joint TCI state switching.

Example 4 may include for UL TCI state chain, SSB, SRS or CSI-RS will be considered as source RS, the number of RS in the chain is no more than 4.

Example 5 may include DL TCI chain can apply for separate UL TCI state switching.

Example 6 may include for TRP-specific BFD, delay requirement is defined assuming that UE will perform BFD in TDM manner.

Example 7 may include for TRP-specific BFD, measurement delay will be scaled by the number of BFD-RS sets.

Example 8 may include for TRP-specific CBD, measurement delay will be scaled by the number of CBD-RS sets.

Example 9 may include a method to be performed by an electronic device in a new radio (NR) cellular network, wherein the method comprises: identifying an uplink (UL) transmission configuration indicator (TCI) action that is to be performed: identifying a UL TCI chain wherein a synchronization signal block (SSB), a channel state information reference signal (CSI-RS), or a sounding reference signal (SRS) is a source reference signal (RS); and performing the UL TCI action based on the UL TCI chain.

Example 10 may include a method to be performed by an electronic device in a new radio (NR) cellular network, wherein the method comprises: identifying an downlink (DL) transmission configuration indicator (TCI) action that is to be performed; identifying a DL TCI chain wherein a synchronization signal block (SSB) associated with a different physical cell identifier (PCID) is a source reference signal (RS); and performing the DL TCI action based on the DL TCI chain.

Example A1 may include a method for a QCL and TCI chain for Rel-17 serving cell and inter-cell BM.

Example A2 may include if a joint TCI chain is defined, SRS cannot be used as source RS in the TCI chain.

Example A3 may define TCI chain for UL TCI and DL TCI separately or jointly.

Example A4 for serving cell, if a separate TCI chain is designed, the TCI chain is defined as follows:

A DL TCI chain for serving cell includes an SSB, and one or more CSI-RS resources, and the TCI state of each Reference Signal includes another Reference Signal in the same TCI chain.

A UL TCI chain for serving cell includes an SSB, and one or more CSI-RS resources, SRS and the TCI state of each Reference Signal includes another Reference Signal in the same TCI chain.

if a joint TCI chain can also be designed:

A TCI chain for serving cell includes an SSB, and one or more CSI-RS resources, or SRS for UL, and the TCI state of each Reference Signal includes another Reference Signal in the same TCI chain.

Example A5 may define separate TCI chain for serving cell and inter-cell BM or a general TCI chain.

Example A6 may include inter-cell BM TCI chain, SSB associated with a different physical cell ID will be included in the TCI chain, one example is as follows:

If separate TCI chain is used:

A DL TCI chain for inter-cell BM includes an SSB, and one or more CSI-RS resources, SSB associated with different PCI, and the TCI state of each Reference Signal includes another Reference Signal in the same TCI chain.

A UL TCI chain for inter-cell BM includes an SSB, and one or more CSI-RS resources, SRS and SSB associated with different PCI, the TCI state of each Reference Signal includes another Reference Signal in the same TCI chain.

if a joint TCI chain can also be designed:

A TCI chain for inter-cell BM includes an SSB, and one or more CSI-RS resources, and SRS for UL TCI, and SSB associated with different PCI, and the TCI state of each Reference Signal includes another Reference Signal in the same TCI chain.

Example A7 may include a method comprising:

determining a DL TCI chain for a serving cell, wherein the first TCI chain includes an SSB and one or more CSI-RS resources, and wherein a TCI state of each Reference Signal includes another Reference Signal in the same DL TCI chain; and transmitting or receiving a DL transmission from the serving cell based on the DL TCI chain.

Example A8 may include the method of example A7 or some other example herein, further comprising:

determining a UL TCI chain for the serving cell, wherein the UL TCI chain includes an SSB and one or more CSI-RS resources, and wherein a SRS and a TCI state of each Reference Signal of the UL TCI chain includes another Reference Signal in the same UL TCI chain; and receiving or transmitting a UL transmission from a UE based on the UL TCI chain.

Example X1 includes an apparatus comprising:

memory to store downlink (DL) transmission configuration indicator (TCI) state chain information; and processing circuitry, coupled with the memory, to:

retrieve the DL TCI state chain information from the memory, wherein the DL TCI state information includes an indication of a source reference signal (RS) for a synchronization signal block (SSB) associated with a physical cell identifier that is different from an identifier of a serving cell; and monitor an SSB based on the DL TCI state chain information.

Example X2 includes the apparatus of example X1 or some other example herein, wherein the DL TCI state chain information applies to separate DL TCI states.

Example X3 includes the apparatus of example X1 or some other example herein, wherein the DL TCI state chain information applies to joint TCI state switching.

Example X4 includes the apparatus of example X1 or some other example herein, wherein the memory further stores uplink (UL) TCI state chain information, and wherein the processing circuitry is further to perform UL spatial relation switching using the UL TCI state chain information.

Example X5 includes the apparatus of example X4 or some other example herein, wherein the UL TCI state chain information includes a source RS for: an SSB, a synchronization reference signal (SRS), or channel state information-reference signal (CSI-RS).

Example X6 includes the apparatus of example X5 or some other example herein, wherein there are four or fewer source RSs in the UL TCI state chain information.

Example X7 includes the apparatus of example X4 or some other example herein, wherein the UL TCI state chain information applies to separate UL TCI state switching.

Example X8 includes the apparatus of example X1 or some other example herein, wherein the processing circuitry is further to perform a transmission reception point (TRP)-specific beam failure detection (BFD) procedure using time-division multiplexing (TDM).

Example X9 includes the apparatus of example X1 or some other example herein, wherein the processing circuitry is further to perform a TRP-specific candidate beam detection (CBD) procedure using a measurement delay that is scaled based on a number of CBD-RS sets.

Example X10 includes the apparatus of any of examples X1-X9 or some other example herein, wherein the apparatus comprises a user equipment (UE) or portion thereof.

Example X11 includes one or more computer-readable media storing instructions that, when executed by one or more processors, configure a user equipment (UE) to:

determine downlink (DL) transmission configuration indicator (TCI) state chain information that includes an indication of a source reference signal (RS) for a synchronization signal block (SSB) associated with a physical cell identifier that is different from an identifier of a serving cell; and monitor an SSB based on the DL TCI state chain information.

Example X12 includes the one or more computer-readable media of example X11 or some other example herein, wherein the DL TCI state chain information applies to separate DL TCI states.

Example X13 includes the one or more computer-readable media of example X11 or some other example herein, wherein the DL TCI state chain information applies to joint TCI state switching.

Example X14 includes the one or more computer-readable media of example X11 or some other example herein, wherein the memory further stores uplink (UL) TCI state chain information, and wherein the memory further stores instructions to configure the UE to perform UL spatial relation switching using the UL TCI state chain information.

Example X15 includes the one or more computer-readable media of example X14 or some other example herein, wherein the UL TCI state chain information includes a source RS for: an SSB, a synchronization reference signal (SRS), or channel state information-reference signal (CSI-RS).

Example X16 includes the one or more computer-readable media of example X15 or some other example herein, wherein there are four or fewer source RSs in the UL TCI state chain information.

Example X17 includes the one or more computer-readable media of example X11 or some other example herein, wherein the UL TCI state chain information applies to separate UL TCI state switching.

Example X18 includes the one or more computer-readable media of example X11 or some other example herein, wherein the media further stores instructions to configure the UE to perform a transmission reception point (TRP)-specific beam failure detection (BFD) procedure using time-division multiplexing (TDM).

Example X19 includes the one or more computer-readable media of example X11 or some other example herein, wherein the media further stores instructions to configure the UE to perform a TRP-specific candidate beam detection (CBD) procedure using a measurement delay that is scaled based on a number of CBD-RS sets.

Example X20 includes one or more computer-readable media storing instructions that, when executed by one or more processors, configure a user equipment (UE) to:

determine joint uplink (UL) and downlink (DL) transmission configuration indicator (TCI) state chain information that includes an indication of a synchronization signal block (SSB) and one or more channel state information-reference signal (CSI-RS) resources, wherein a TCI state of a first reference signal includes a second reference signal in a common TCI chain; and monitor an SSB based on the joint UL and DL TCI state chain information.

Example X21 includes the one or more computer-readable media of example X20 or some other example herein, wherein the joint UL and DL TCI state chain information includes an indication of a sounding reference signal (SRS) for UL.

Example X22 includes the one or more computer-readable media of example X20 or some other example herein, wherein the joint UL and DL TCI state chain information includes an indication of an SSB associated with a physical cell identifier that is different from a serving cell for inter-cell beam management (BM).

Example Z01 may include an apparatus comprising means to perform one or more elements of a method described in or related to any of examples 1-X22, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-10, or any other method or process described herein.

Example Z03 may include an apparatus comprising logic, modules, or circuitry to perform one or more elements of a method described in or related to any of examples 1-X22, or any other method or process described herein.

Example Z04 may include a method, technique, or process as described in or related to any of examples 1-X22, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X22, or portions thereof.

Example Z06 may include a signal as described in or related to any of examples 1-X22, or portions or parts thereof.

Example Z07 may include a datagram, packet, frame, segment, protocol data unit (PDU), or message as described in or related to any of examples 1-X22, or portions or parts thereof, or otherwise described in the present disclosure.

Example Z08 may include a signal encoded with data as described in or related to any of examples 1-X22, or portions or parts thereof, or otherwise described in the present disclosure.

Example Z09 may include a signal encoded with a datagram, packet, frame, segment, protocol data unit (PDU), or message as described in or related to any of examples 1-X22, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X22, or portions thereof.

Example Z11 may include a computer program comprising instructions, wherein execution of the program by a processing element is to cause the processing element to carry out the method, techniques, or process as described in or related to any of examples 1-X22, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |

-continued

| | |
|---|---|
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |

-continued

| | |
|---|---|
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |

-continued

| | |
|---|---|
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |

-continued

| | |
|---|---|
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |

-continued

| | |
|---|---|
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |

-continued

| | |
|---|---|
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |

-continued

| | |
|---|---|
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | SS/PBCH Block Resource Indicator, Synchronization |

-continued

| | |
|---|---|
| Block SSBRI | Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |

-continued

| | |
|---|---|
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry." as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry." as used herein refers to, is part of, or includes circuitry that enables the exchange of information between two or more components or devices. The term "interface circuitry." may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance." "computer appliance." or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link 30 allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus of a user equipment (UE), the apparatus comprising:

memory to store transmission configuration indicator (TCI) chains corresponding to a unified TCI framework, the TCI chains including a downlink TCI chain (DL TCI chain) and an uplink TCI chain (UL TCI chain), wherein:

individual ones of the DL TCI chain and the UL TCI chain comprise a synchronization signal block (SSB) and one or more channel state information reference signal (CSI-RS) resources; and the SSB of the DL TCI chain is associated with a physical cell identifier that is different from an identifier of a serving cell; and processing circuitry, coupled with the memory, to:

receive, from the memory, the TCI chains;

for TCI state switching, based on the TCI chain having no more than four reference signals, consider two of the four reference signals to be quasi-co-located (QCLed); and encode or decode signals for wireless communication based on the TCI chains.

2. The apparatus of claim 1, the processing circuitry to further use the SSB of the DL TCI chain as a source reference signal (RS).

3. The apparatus of claim 1, wherein the SSB of the UL TCI chain is associated with a physical cell identifier that is different from an identifier of a serving cell.

4. The apparatus of claim 3, the processing circuitry to further use the SSB of the UL TCI chain as a source reference signal (RS).

5. The apparatus of claim 1, the processing circuitry to further, perform transmission reception point (TRP)-specific beam failure detection (BFD) in a time division multiplexed (TDM) manner.

6. The apparatus of claim 1, further including a radio frequency front end coupled to the processing circuitry.

7. The apparatus of claim 6, further including one or more antennas coupled to the processing circuitry to send and to receive wireless signals.

8. One or more non-transitory computer-readable media storing instructions to cause, upon execution of the instructions by one or more processors of a User Equipment (UE), the UE to:

store, in a memory of the UE, transmission configuration indicator (TCI) chains corresponding to a unified TCI framework, the TCI chains including a downlink TCI chain (DL TCI chain) and an uplink TCI chain (UL TCI chain), wherein:

individual ones of the DL TCI chain and the UL TCI chain comprise a synchronization signal block (SSB) and one or more channel state information reference signal (CSI-RS) resources; and the SSB of the DL TCI chain is associated with a physical cell identifier that is different from an identifier of a serving cell;

retrieve, from the memory of the UE, the TCI chains;

for TCI state switching, based on the TCI chain having no more than four reference signals, consider two of the four reference signals to be quasi-co-located (QCLed); and encode or decode signals for wireless communication based on the TCI chains.

9. The one or more non-transitory computer-readable media of claim 8, the instructions to further cause, upon execution of the instructions by the one or more processors, the UE to further use the SSB of the DL TCI chain as a source reference signal (RS).

10. The one or more non-transitory computer-readable media of claim 8, wherein the SSB of the UL TCI chain is associated with a physical cell identifier that is different from an identifier of a serving cell.

11. The one or more non-transitory computer-readable media of claim 10, the instructions to further cause, upon execution of the instructions by the one or more processors, the UE to further use the SSB of the UL TCI chain as a source reference signal (RS).

12. The one or more non-transitory computer-readable media of claim 8, the instructions to further cause, upon execution of the instructions by the one or more processors, the UE to further, perform transmission reception point (TRP)-specific beam failure detection (BFD) in a time division multiplexed (TDM) manner.

13. A method to be performed at a User Equipment (UE), the method including:

storing, in a memory of the UE, transmission configuration indicator (TCI) chains corresponding to a unified TCI framework, the TCI chains including a downlink TCI chain (DL TCI chain) and an uplink TCI chain (UL TCI chain), wherein:

individual ones of the DL TCI chain and the UL TCI chain comprise a synchronization signal block (SSB) and one or more channel state information reference signal (CSI-RS) resources; and the SSB of the DL TCI chain is associated with a physical cell identifier that is different from an identifier of a serving cell;

retrieving, from the memory of the UE, the TCI chains;

based on the TCI chain having no more than four reference signals, considering two of the four reference signals to be quasi-co-located (QCLed); and encoding or decoding signals for wireless communication based on the TCI chains.

14. The method of claim 13, further including use the SSB of the DL TCI chain as a source reference signal (RS).

15. The method of claim 13, wherein the SSB of the UL TCI chain is associated with a physical cell identifier that is different from an identifier of a serving cell.

16. The method of claim 15, further including using the SSB of the UL TCI chain as a source reference signal (RS).

17. The method of claim 15, further including performing transmission reception point (TRP)-specific beam failure detection (BFD) in a time division multiplexed (TDM) manner.

* * * * *